United States Patent
Ohno et al.

(10) Patent No.: US 9,853,308 B2
(45) Date of Patent: Dec. 26, 2017

(54) SOLID OXIDE FUEL CELL

(75) Inventors: Takeshi Ohno, Komaki (JP); Satoru Ishida, Komaki (JP); Hiroshi Sumi, Komaki (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 175 days.

(21) Appl. No.: 14/114,571

(22) PCT Filed: Feb. 21, 2012

(86) PCT No.: PCT/JP2012/001136
§ 371 (c)(1),
(2), (4) Date: Oct. 29, 2013

(87) PCT Pub. No.: WO2012/153446
PCT Pub. Date: Nov. 15, 2012

(65) Prior Publication Data
US 2014/0051009 A1  Feb. 20, 2014

(30) Foreign Application Priority Data
May 11, 2011  (JP) .................. 2011-105827

(51) Int. Cl.
*H01M 8/04082* (2016.01)
*H01M 8/2432* (2016.01)
(Continued)

(52) U.S. Cl.
CPC ......... *H01M 8/04201* (2013.01); *H01M 4/86* (2013.01); *H01M 8/026* (2013.01);
(Continued)

(58) Field of Classification Search
CPC .................................................. H01M 8/04
See application file for complete search history.

(56) References Cited

U.S. PATENT DOCUMENTS 4,943,496 A * 7/1990 Okada .................... B22F 3/114
427/115
5,369,711 A * 11/1994 Williamson, III ... H03G 3/3026
381/104
(Continued)

FOREIGN PATENT DOCUMENTS

DE  102009003074 A1  11/2010
EP  1598892 A1  11/2005
(Continued)

OTHER PUBLICATIONS

Office Action with Examination Search Report dated Sep. 29, 2015 for corresponding Canadian Patent Application No. 2,832,329.
(Continued)

*Primary Examiner* — Sarah A Slifka
*Assistant Examiner* — Brian Ohara
(74) *Attorney, Agent, or Firm* — Sughrue Mion, PLLC

(57) ABSTRACT

A solid oxide fuel cell includes a fuel cell main body which includes a cathode layer, a solid electrolyte layer, and an anode layer and which has a power generation function; a connector disposed to face one electrode layer of the cathode layer and the anode layer; a current collector which is disposed between the one electrode layer and the connector and which is in contact with a surface of the one electrode layer and a surface of the connector, the surfaces facing each other, to thereby electrically connect the one electrode layer and the connector; and a groove provided in a portion of a surface of the one electrode layer, which surface is located on the side where the one electrode layer is in contact with the current collector, the portion of the surface being not in contact with the current collector.

12 Claims, 4 Drawing Sheets

(51) Int. Cl.
*H01M 8/2457* (2016.01)
*H01M 8/2483* (2016.01)
*H01M 4/86* (2006.01)
*H01M 8/026* (2016.01)
*H01M 8/0273* (2016.01)
*H01M 8/1213* (2016.01)
*H01M 8/2465* (2016.01)
*H01M 8/2485* (2016.01)
*H01M 8/0258* (2016.01)
*H01M 8/124* (2016.01)

(52) U.S. Cl.
CPC ....... *H01M 8/0273* (2013.01); *H01M 8/1213* (2013.01); *H01M 8/2432* (2016.02); *H01M 8/2457* (2016.02); *H01M 8/2465* (2013.01); *H01M 8/2483* (2016.02); *H01M 8/2485* (2013.01); *H01M 8/0258* (2013.01); *H01M 2008/1293* (2013.01)

(56) References Cited

U.S. PATENT DOCUMENTS

| | | | | |
|---|---|---|---|---|
| 5,824,428 | A * | 10/1998 | Nishida | H01M 8/04074 429/479 |
| 2002/0127452 | A1 | 9/2002 | Wilkinson et al. | |
| 2003/0148185 | A1 * | 8/2003 | Kusumoto | H01M 4/13 429/233 |
| 2004/0185323 | A1 * | 9/2004 | Fowler | H01M 4/8605 429/440 |
| 2005/0170234 | A1 | 8/2005 | Liu et al. | |
| 2005/0255355 | A1 | 11/2005 | Ukai et al. | |
| 2008/0160389 | A1 * | 7/2008 | Lee | H01M 8/0247 429/444 |
| 2008/0280186 | A1 | 11/2008 | Iwanschitz et al. | |
| 2009/0042081 | A1 * | 2/2009 | Kotani | H01M 8/0256 429/413 |
| 2009/0286125 | A1 | 11/2009 | Setlock et al. | |
| 2009/0286152 | A1 * | 11/2009 | Nishino | H01M 2/0227 429/178 |
| 2009/0297906 | A1 | 12/2009 | Harada | |

FOREIGN PATENT DOCUMENTS

| | | |
|---|---|---|
| JP | 5-82135 A | 4/1993 |
| JP | 6-310156 A | 11/1994 |
| JP | 8-96820 A | 4/1996 |
| JP | 2005-322547 A | 11/2005 |
| JP | 2006-344486 A | 12/2006 |
| JP | 2007-149694 A | 6/2007 |
| JP | 20084423 A | 1/2008 |
| JP | 2008-282808 A | 11/2008 |
| JP | 2009-187887 A | 8/2009 |
| JP | 2009-245687 A | 10/2009 |
| JP | 2009-245897 A | 10/2009 |
| JP | 2009-283352 A | 12/2009 |
| JP | 2010-15977 A | 1/2010 |
| JP | 2011-70794 A | 4/2011 |

OTHER PUBLICATIONS

Communication dated Jul. 7, 2015, issued by the European Patent Office in counterpart Application No. 12782274.0.
Communication dated Feb. 5, 2015, issued by the European Patent Office in corresponding European Application No. 12782274.0.
Communication dated Jan. 27, 2015, issued by the Japan Patent Office in corresponding application No. 2011-105827.
Communication dated Jun. 9, 2016 from the Canadian Intellectual Property Office issued in corresponding Application No. 2,832,329, pp. 1-3.

* cited by examiner

SOLID OXIDE FUEL CELL

CROSS REFERENCE TO RELATED APPLICATIONS

This application is a National Stage of International Application No. PCT/JP2012/001136, filed on Feb. 21, 2012, which claims priority from Japanese Patent Application No. 2011-105827, filed on May 11, 2011, the contents of all of which are incorporated herein by reference in their entirety.

TECHNICAL FIELD

The present invention relates to a solid oxide fuel cell.

BACKGROUND ART

There has been known a solid oxide fuel cell (hereinafter may be referred to as "SOFC" or simply "fuel cell") in which solid oxide is used as electrolyte. SOFC has a stack (fuel cell stack) formed by stacking a large number of fuel cells each including a plate-shaped solid electrolyte body and an anode and a cathode provided on opposite sides of the solid electrolyte body. A fuel gas and an oxidizing gas (e.g., oxygen within air) are supplied to the anode and the cathode, respectively, and are chemically reacted with each other via the solid electrolyte body, whereby electric power is generated.

Such a fuel cell includes a pair of inter connectors and a fuel cell main body (a laminate of a cathode, a solid electrolyte body, and an anode). A current collector is disposed for electrical connection between the fuel cell main body and the inter connector.

Another solid oxide fuel cell is disclosed (see Patent Document 1). In the disclosed solid oxide fuel cell, the current collector can be attached to at least one of the anode and the cathode, and depressions and projections which are engageable with depressions and projections of the current collector are formed on at least a portion of a surface of the electrode to which the current collector is attached. Also, a fuel cell in which a gas diffusion layer is disposed on the electrode surface of a membrane electrode assembly and a surface of the gas diffusion layer in contact with a gas flow path is roughened is disclosed (see Patent Document 2).

PRIOR ART DOCUMENTS

Patent Documents

Patent Document 1: Japanese Patent Application Laid-Open (kokai) No. 2009-245897
Patent Document 2: Japanese Patent Application Laid-Open (kokai) No. 2009-283352

SUMMARY OF THE INVENTION

Problems to be Solved by the Invention

However, the fuel batteries disclosed in Patent Documents 1 and 2 can not be said to be good in terms of the efficiency of gas intake from the surfaces of the cathode layer and the anode layer. The depressions and projections formed on the surface of the electrode in the fuel cell described in Patent Document 1 are for engagement with the current collector. The roughening of the surface of the gas diffusion layer in the fuel cell described in Patent Document 2 is performed in order to reduce the contact resistance between the gas diffusion layer and the flow path formed by a porous member. As described above, the depressions and projections described in Patent Document 1 and the roughening described in Patent Document 2 are unlikely to contribute to an increase in the efficiency of gas intake from the surfaces of the cathode layer and the anode layer.

An object of the present invention is to provide a solid oxide fuel cell which has an increased gas utilization factor at a cathode layer or an anode layer.

Means for Solving the Problems

A solid oxide fuel cell according to the present invention comprises a fuel cell main body which includes a cathode layer, a solid electrolyte layer, and an anode layer and which has a power generation function; a connector disposed to face one electrode layer of the cathode layer and the anode layer; a current collector which is disposed between the one electrode layer and the connector and which is in contact with a surface of the one electrode layer and a surface of the connector, the surfaces facing each other, to thereby electrically connect the one electrode layer and the connector; and a groove provided in a portion of a surface of the one electrode layer, which surface is located on the side where the one electrode layer is in contact with the current collector, the portion of the surface being not in contact with the current collector.

A groove is provided in a portion of a surface of one of the cathode layer and the anode layer, which surface is located on the side where the one electrode layer is in contact with the current collector, the portion of the surface being not in contact with the current collector. Therefore, the contract area between a gas and a surface of the electrode layer from which the gas diffuses into the interior of the electrode layer can be increased. As a result, the gas diffusibility at the electrode layer is improved, whereby the gas utilization factor (gas distributivity) is improved.

Preferably, the surface of the one electrode layer which is in contact with the current collector has an arithmetic mean roughness Ra greater than 0.3 µm.

By making the arithmetic mean roughness Ra greater than 0.3 µm, the gas contact area of the electrode layer can be increased.

Preferably, the surface of the one electrode layer which is in contact with the current collector has an arithmetic mean waviness Wa less than 0.3 µm.

The flow of gas along the surface of the one electrode layer can be improved, whereby the amount of gas supplied to a downstream side surface can be increased, and the gas can be distributed to the entire surface of the one electrode layer in an improved manner.

Preferably, the groove is formed along a direction in which the oxidizing gas or the fuel gas flows.

The flow of gas along the surface of the one electrode layer from the upstream side toward the downstream side can be improved, whereby the gas can be distributed to the entire surface of the one electrode layer in an improved manner.

Preferably, the current collector is made of a material which is the same as the material of the connector such that the current collector is united with the connector.

Since the current collector can be integrally formed by using the same material (e.g., SUS) as that of the connector, the manufacturing process can be simplified.

Provision of a groove in a portion of a surface of one of the cathode layer and the anode layer, which surface is located on the side where the one electrode layer is in contact with the current collector, the portion of the surface being not in contact with the current collector, is particularly effective in the case where the current collector is made of a dense material such as SUS. Namely, when the gas flowing through the gas flow path enters the interior of the electrode layer through the surface thereof, the gas must pass through a portion of the electrode surface where the current collector is not provided. By providing a groove in a surface portion with which the current collector does not contact, a sufficiently large diffusion area can be secured, and gas diffusion can be promoted more effectively.

Effect of the Invention

According to the present invention, a solid oxide fuel cell which has an increased gas utilization factor at a cathode layer or an anode layer can be provided.

BRIEF DESCRIPTION OF THE DRAWINGS

MODES FOR CARRYING OUT THE INVENTION (First Embodiment)
An embodiment of the present invention will now be described in detail with reference to the drawings.
FIG. 1 is a perspective view of a solid oxide fuel cell (fuel cell stack) 10 according to a first embodiment of the present invention. The solid oxide fuel cell 10 is an apparatus which generates electric power when a fuel gas and an oxidizing gas are supplied thereto.
Examples of the fuel gas include hydrogen, hydrocarbon serving as a reducer, a gas mixture of hydrogen and hydrocarbon, a fuel gas obtained by passing one of these gases through water at a predetermined temperature for humidification, and a fuel gas obtained by mixing steam into one of these gases. No limitation is imposed on hydrocarbon, and examples of the hydrocarbon include natural gas, naphtha, and gas obtained through gasification of coal. It is preferred that hydrogen be used as a fuel gas. Of the above-mentioned plurality of types of fuel gases, a fuel gas of a single type may be used solely or fuels gases of two or more types may be used in combination. Also, the fuel gas may contain an inert gas such as nitrogen or argon in an amount of 50 vol. % or less.
An example of the oxidizing gas is a gas mixture of oxygen and another gas. This gas mixture may contain an inert gas such as nitrogen or argon in an amount of 80 vol. % or less. Of these oxidizing gases, air (containing nitrogen in an amount of about 80 vol. %) is preferred because air is safe and inexpensive.
The solid oxide fuel cell 10 has a generally rectangular parallelepiped shape, and has a top surface 11, a bottom surface 12, and through-holes 21 to 28. The through-holes 21 to 24 extend through the solid oxide fuel cell 10 at positions near the sides of the top surface 11 and the bottom surface 12 (near the sides of an anode frame 150 to be described later). The through-holes 25 to 28 extend through the solid oxide fuel cell 10 at positions near the apexes of the top surface 11 and the bottom surfaces 12 (near the apexes of the anode frame 150 to be described later). Connection members (bolts 41 to 48 and nuts 51 to 58 which serve as fasteners) are attached to the through-holes 21 to 28. Notably, the nuts 53, 54, and 57 are not illustrated for easy understanding.

Figure 1:
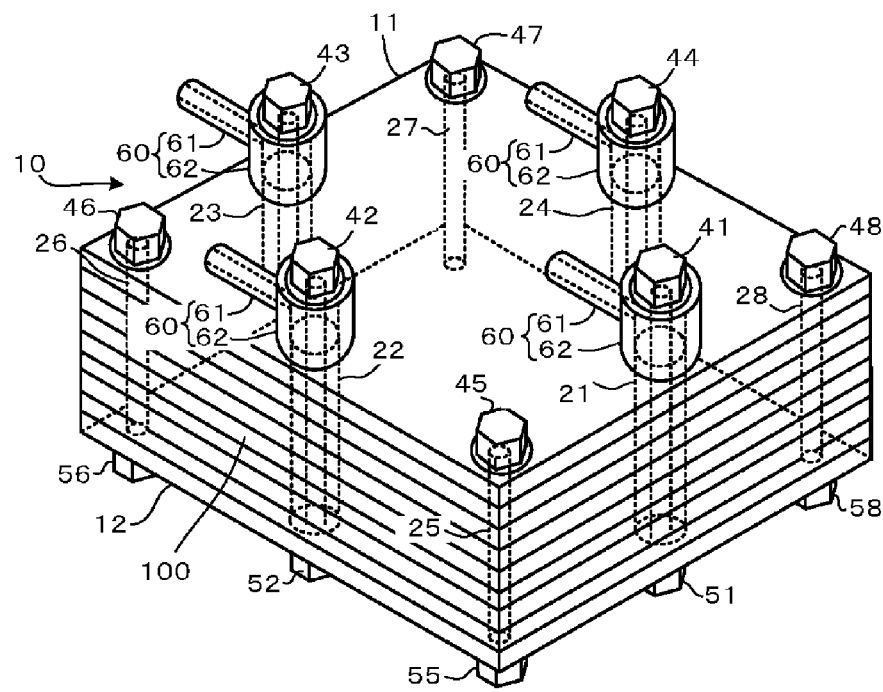
FIG. 1 Perspective view of a solid oxide fuel cell 10 according to a first embodiment of the present invention.

Members 60 are disposed at the openings of the through-holes 21 to 24 on the side toward the top surface 11. The bolts 41 to 44 are passed through the through-holes of the members 60 (members 62) and the through-holes 21 to 24, and the nuts 51 to 54 are screwed onto the bolts 41 to 44.

Each member 60 has a member 62 and an introduction pipe 61. The member 62 has a generally cylindrical shape, and has a generally fat top surface, a generally fat bottom surface, and a curved side surface. The introduction pipe 61 has a through-hole which extends between the top surface and the bottom surface. The through-hole of the member 62 communicates with the through-hole of the introduction pipe 61.

The diameter of the through-hole of the member 62 is approximately equal to that of the through-holes 21 to 24. Since the diameter of the shafts of the bolts 41 to 44 is smaller than these diameters, gases (oxidizing gas (air), fuel gas remaining after generation of electric power, oxidizing gas remaining after generation of electric power, and fuel gas) pass though the spaces between the wall surfaces of the through-holes of the members 62 and the shafts of the bolts 41 to 44 and spaces between the wall surfaces of the through-holes 21 to 24 and the shafts of the bolts 41 to 44. Namely, the oxidizing gas (air) and the fuel gas supplied to the corresponding introduction pipes 61 flow into the solid oxide fuel cell 10 through the through-holes 21 and 24, respectively. The oxidizing gas (air) remaining after generation of electric power and the fuel gas remaining after generation of electric power which are discharged from the solid oxide fuel cell 10 flow out of the corresponding introduction pipes 61 through the through-holes 23 and 22, respectively.

The solid oxide fuel cell 10 is formed by stacking a plurality of plate-shaped fuel cells 100, which are power generation units. The plurality of fuel cells 100 are electrically connected in series.

Figure 2:
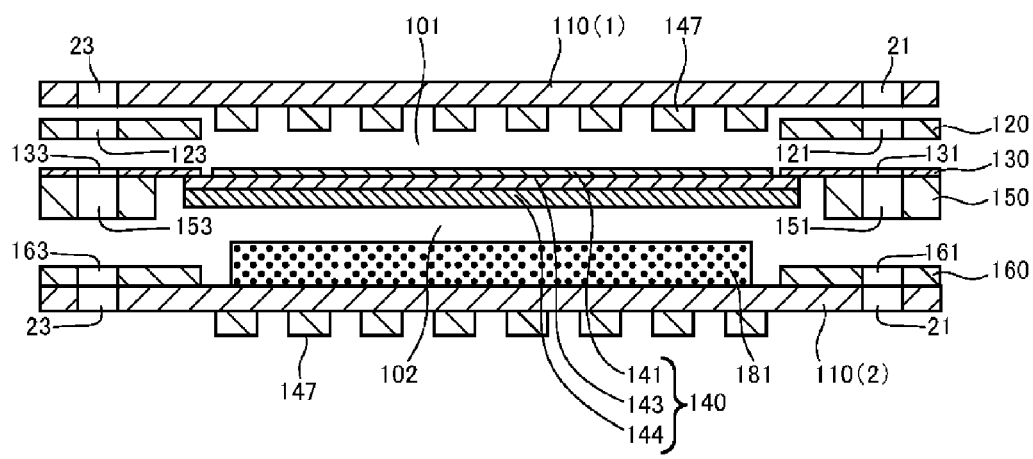
FIG. 2 Sectional view of a fuel cell 100.
Figure 3:
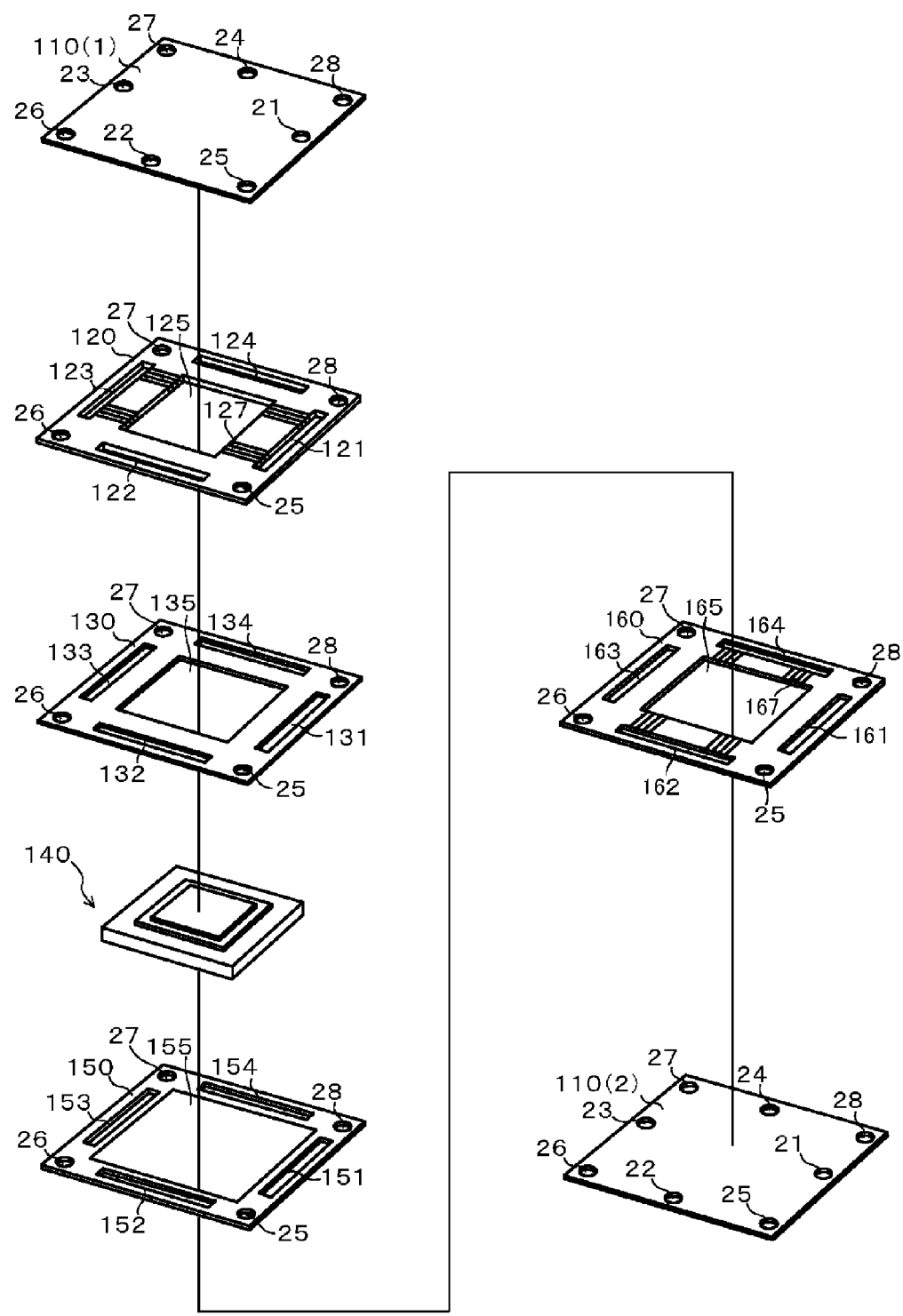
FIG. 3 Exploded perspective view of the fuel cell 100.

FIG. 2 is a sectional view of the fuel cell 100. FIG. 3 is an exploded perspective view of the fuel cell 100.

As shown in FIG. 2, the fuel cell 100 is a so-called anode-support-type fuel cell. A fuel cell main body 140 is disposed between upper and lower inter connectors 110(1) and 110(2) made of a metal. An air flow path 101 and a fuel gas flow path 102 are disposed between the fuel cell main body 140 and the inter connectors 110(1) and 110(2).

The fuel cell main body 140 is formed by stacking a cathode layer 141, a solid electrolyte layer 143, and an anode layer 144.

Examples of the material of the cathode layer 141 include perovskite-type oxide, various noble metals, and cermet composed of noble metal and ceramic. An example of the perovskite-type oxide is LSCF ($La_{1-x}Sr_xCo_{1-y}Fe_yO_3$-type complex oxide).

The cathode layer 141 has a thickness of, for example, about 100 μm to about 300 μm; more specifically, a thickness of about 150 μm.

Examples of the material of the solid electrolyte layer 143 include YSZ (yttria-stabilized zirconia), ScSZ (scandiastabilized zirconia), SDC (samaria-doped ceria), GDC (gadolinia-doped ceria), and perovskite-based oxide.

For example, metal such as Ni, cermet composed of a metal such as Ni and ceramic (e.g., a mixture of Ni and $ZrO_2$-based ceramic (YSZ, etc.), or the like can be used as the material of the anode layer 144. Notably, in the case where the mixture of Ni and $ZrO_2$-based ceramic is used, a mixture (NiO—$ZrO_2$) of NiO and $ZrO_2$-based ceramic may be used as an initial material (a material before start of operation of the fuel cell 100). This is because, since the anode layer 144 is exposed to a reducing atmosphere, as a result of progress of a reduction reaction, the mixture of NiO and $ZrO_2$-based ceramic changes to a mixture of Ni and $ZrO_2$-based ceramic.

The anode layer 144 has a thickness of about 0.5 mm to about 5 mm, preferably, about 0.7 mm to about 1.5 mm. This is because the anode layer 144 must serve as a support substrate which has a sufficiently high mechanical strength, etc. for supporting the solid electrolyte layer 143, etc.

As shown in FIGS. 2 and 3, the fuel cell 100 includes a glass seal portion 120, a separator 130, an anode frame 150, a gas seal portion 160, and a current collector 181, which are disposed between the upper and lower inter connectors 110(1) and 110(2). These components are stacked and united together whereby the fuel cell 100 is formed.

Current collectors 147 are disposed between the cathode layer 141 and the inter connector 110(1) in order to secure electrical continuity therebetween. The current collector 181 is disposed between the anode layer 144 and the inter connector 110(2) in order to secure electrical continuity therebetween. Current connectors 147 are disposed between the inter connector 110(2) and the cathode layer (not shown) of another fuel cell located below the fuel cell 100 so as to secure electrical continuity therebetween.

The current collectors 147 and 181 may be made of a metal such as stainless steel (SUS). The current collectors 147 may be formed integrally with the inter connectors 110(1) and 110(2). The current collector 181 may be formed integrally with the inter connector 110(2). In this case, it is preferred that the current collectors 147 and 181 be formed of the same type of (or the same) material as that of the inter connectors 110(1) and 110(2).

Notably, as will be described later, distal ends of the current collectors 147 are intruded into the cathode layer 141. However, in FIG. 2, the current collectors 147 and the cathode layer 141 are depicted in a state in which they are separated from each other.

The members which constitute the fuel cell 100 will now be described in further detail. Notably, since the fuel cell 100 has a square planar shape, it is desired that the members which constitute the fuel cell 100 also have square planar shapes.

Each of the inter connectors 110(1) and 110(2) is a plate member which is made of, for example, ferric stainless steel and has a thickness of 0.3 mm to 2.0 mm. Through-holes 21 to 28 which are circular holes having a diameter of, for example, 10 mm and through which the bolts 41 to 48 are passed are formed in an outer edge portion of each of the inter connectors 110(1) and 110(2) at equal intervals. The inter connectors 110(1) and 110(2) correspond to the connector which is disposed to face one of the cathode layer and the anode layer.

The gas seal portion 120 is disposed on the side where the cathode layer 141 is present. The gas seal portion 120 is a frame-shaped plate member which is made of, for example, mica and has a thickness of 0.2 mm to 1.0 mm. Through-holes 25 to 28 through which the bolts 45 to 48 are passed are formed at the four corners thereof.

The gas seal portion 120 has generally rectangular through-holes 121 to 124 (100 mm (length)×10 mm (width)) which serve as gas flow paths. The through-holes 121 to 124 are formed in edge portions extending along the four sides thereof such that the through-holes 121 to 124 extend along the four sides and communicate with the through-holes 21 to 24 through which the bolts 41 to 44 are passed. Namely, as viewed in the stacking direction, each of the through-holes 121 to 124 contains corresponding one of the through-holes 21 to 24.

In the gas seal portion 120, four narrow, rectangular cutouts 127 (20 mm (length)×5 mm (width)) which serve as gas flow paths are formed on each of right and left frame portions of the gas seal portion 120 such that the cutouts 127 communicate with a square opening 125 at the center and the left and right through-holes 121 and 123.

Notably, the cutouts 127 may be formed in the shape of through-holes. The cutouts 127 may be grooves which are formed on one surface of the gas seal portion 120. The cutouts 127 can be formed by laser machining or press working.

The cutouts 127 are disposed symmetrically with respect to a line connecting the centers of the left and right sides. The number of the cutouts 127 is freely set, for example, such that six or more cutouts are provided for each side.

The separator 130 is joined to the top surface of an outer edge portion of the fuel cell main body 140 and isolates the air flow path 101 and the fuel gas flow path 102 from each other. The separator 130 is a frame-shaped plate member which is made of, for example, ferric stainless steel and has a thickness of 0.02 mm to 0.3 mm. The separator 130 has a square opening 135 formed at the center thereof, and the above-mentioned fuel cell main body 140 is joined to the separator 130 such that the fuel cell main body 140 closes the opening 135.

Like the above-mentioned gas seal portion 120, the separator 130 has through-holes 25 to 28 which have the same shape as the through-holes 25 to 28 of the gas seal portion 120 and are formed at the four corners thereof, and through-holes 131 to 134 (serving as first gas flow paths) which have the same shape as the through-holes 121 to 124 of the gas seal portion 120 and extend along the four sides thereof.

The anode frame 150 is disposed on the side where the fuel gas flow path 102 is present. The anode frame 150 is a frame-shaped plate member which has an opening 155 at the center thereof, which is made of, for example, ferric stainless steel, and which has a thickness of 0.5 mm to 2.0 mm. Like the separator 130, the anode frame 150 has through-holes 25 to 28 which have the same shape as the through-holes 25 to 28 of the separator 130 and are formed at the four corners thereof, and through-holes 151 to 154 which extend along the four sides thereof and which serve as gas flow paths.

The gas seal portion 160 is disposed on the side where the anode layer 144 is present. The gas seal portion 160 is a frame-shaped plate member which is made of, for example, mica and has a thickness of 0.2 mm to 1.0 mm. Through-holes 25 to 28 through which the bolts 45 to 48 are passed are formed at the four corners thereof.

The gas seal portion 160 has generally rectangular through-holes 161 to 164 (100 mm (length)×10 mm (width)) which serve as gas flow paths. The through-holes 161 to 164 are formed in edge portions extending along the four sides thereof such that the through-holes 161 to 164 extend along the four sides and communicate with the through-holes 21 to 24 through which the bolts 41 to 44 are passed.

In the gas seal portion 160, four narrow, rectangular cutouts 167 (20 mm (length)×5 mm (width)) which serves as gas flow paths are formed on each of right and left frame portions of the gas seal portion 160 such that the cutouts 167 communicate with a square opening 165 at the center and the left and right through-holes 161 and 163.

Notably, the cutouts 167 may be formed in the shape of through-holes. The cutouts 167 may be grooves which are formed on one surface of the gas seal portion 160. The cutouts 167 can be formed by laser machining or press working.

The cutouts 167 are disposed symmetrically with respect to a line connecting the centers of the left and right sides. The number of the cutouts 167 is freely set, for example, such that six or more cutouts are provided for each side.

Figure 4:
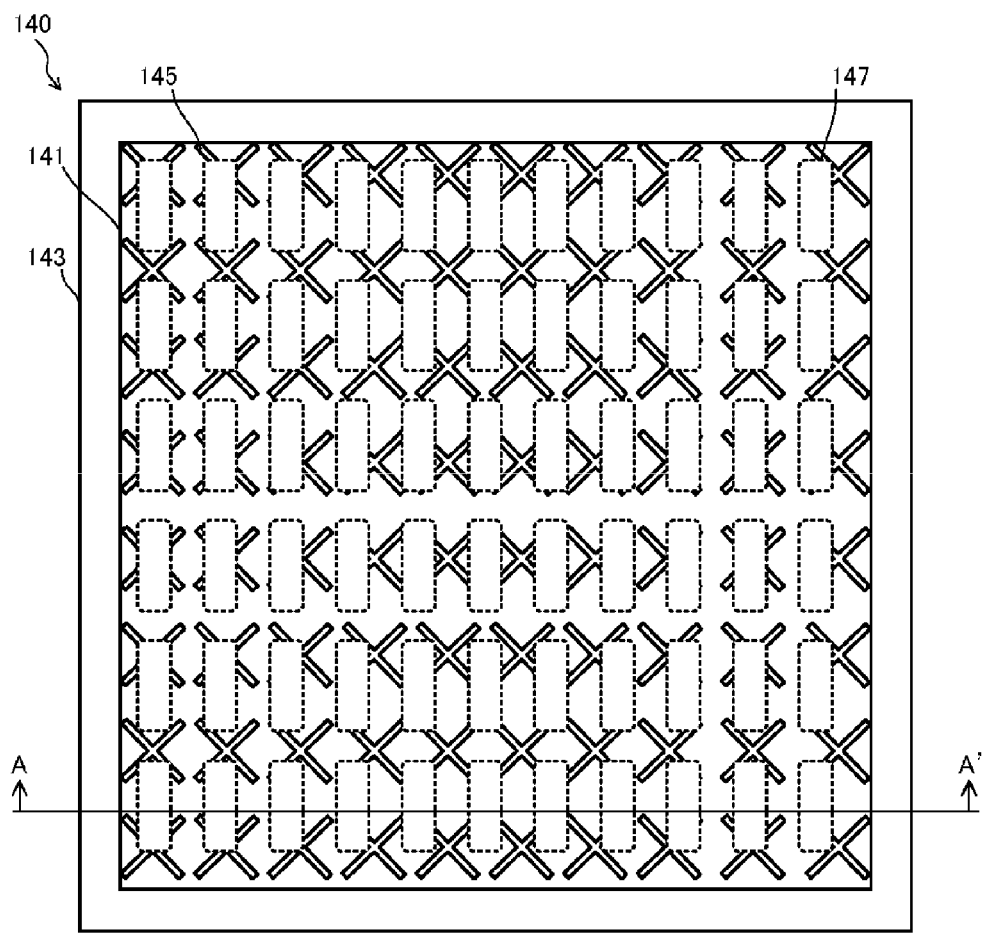
FIG. 4 Plan view of a fuel cell main body 140.
Figure 5:
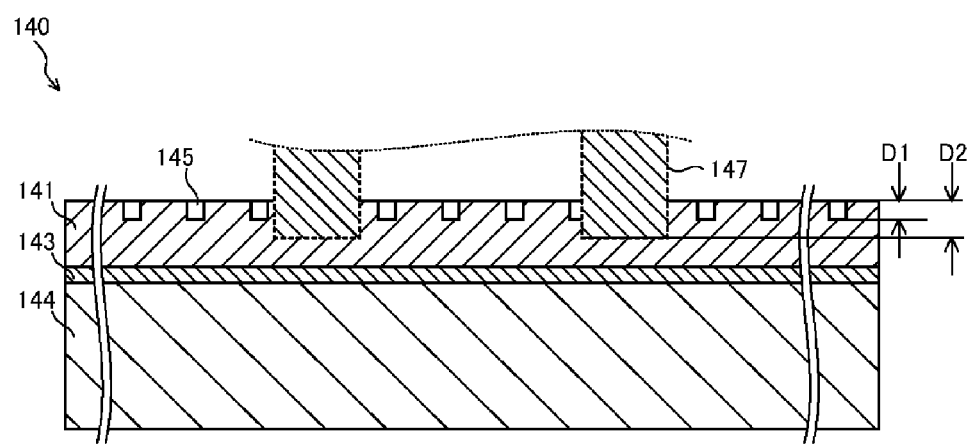
FIG. 5 Partial sectional view showing a cross section of a portion of the fuel cell main body 140.
Figure 6:
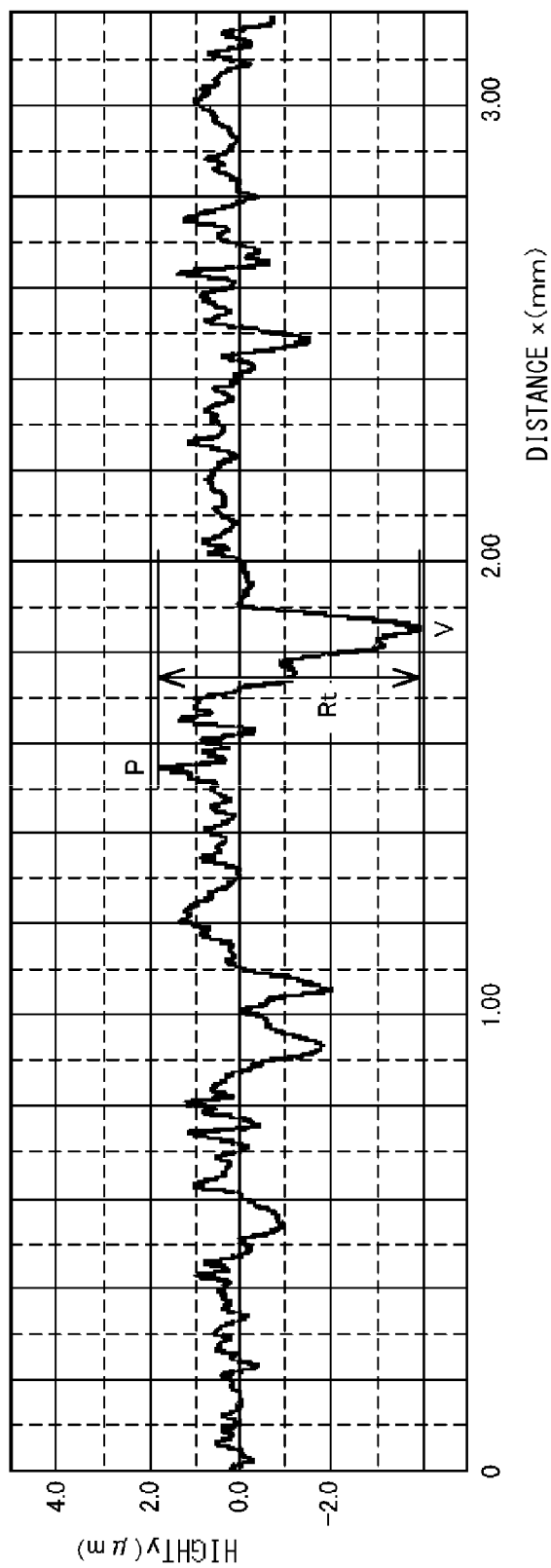
FIG. 6 View showing the sectional profile of the fuel cell main body 140.

FIG. 4 is a plan view of the fuel cell main body 140. FIG. 5 is a partial sectional view showing a cross section of a portion of the fuel cell main body 140 taken along line A-A' of FIG. 4. FIG. 6 is a view showing the sectional profile (accurately, roughness curve) of the fuel cell main body 140 (the cathode layer 141).

Notably, in FIGS. 4 and 5, the inter connector 110(1) is omitted for easily understanding.

As shown in FIGS. 4 and 5, recesses (grooves) 145 having a depth D1 are formed on the surface of the cathode layer 141 of the fuel cell 100. Also, the distal ends of the current collectors 147 are intruded into the cathode layer 141 to a depth D2 (e.g., about 5 µm to about 70 µm).

When the fuel cell 100 is manufactured, the cathode layer 141 and the current collectors 147 are superimposed on and pressed against each other, whereby the distal ends of the current collectors 147 are intruded into the cathode layer 141. As a results, despite the fact that the recesses 145 are provided on the cathode layer 141, reliable connection is established between the current collectors 147 and the cathode layer 141. The area of contact between the current collectors 147 and the cathode layer 141 increases, whereby the contact resistance thereof decreases. From the viewpoint of enhancing the reliability of connection, it is preferred that the depth D2 of intrusion of the current collectors 147 be greater than the depth D1 of the recesses 145.

The oxidizing gas is assumed to flow downward along the surface of the cathode layer 141 from the upper side of the sheet of FIG. 4. The recesses 145 are exposed and come into contact with the oxidizing gas. Each recess 145 extends in two directions which incline in relation to the direction of the flow path (the vertical direction in FIG. 4) (specifically, in directions which are inclined leftward and rightward from the vertical direction by an angle of 45 degrees in FIG. 4). Each recess 145 has a shape and a size different from those of the bottom portion of each current collector 147. As will be described later, the depth D1 of the recesses 145 is defined by the maximum cross-sectional height Rt of the roughness curve, and is, for example, 3 µm.

Since the recesses 145 are formed on the surface of the cathode layer 141, the surface area of the cathode layer 141 increases. Also, since the extension directions of each recess 145 have components along the direction (vertical direction) of the flow path of the oxidizing gas, the oxidizing gas is distributed to the entire surface of the cathode layer 141 through the recesses 145.

Notably, the flow of the oxidizing gas along the surface of the cathode layer 141 may be promoted by rendering the direction of the recesses 145 coincident with the direction of the flow path (in the vertical direction in FIG. 4).

It is preferred that the arithmetic mean roughness Ra of the surface of the cathode layer 141 be 0.3 µm or greater. As a result of roughening of the surface of the cathode layer 141, the surface area of the cathode layer 141 can be increased, whereby intake of the oxidizing gas into the cathode layer 141 becomes easier.

It is preferred that the arithmetic mean waviness Wa of the surface of the cathode layer 141 be 0.3 µm or less. As a result of reduction of the waviness (unevenness) of the surface of the cathode layer 141, distribution of gas to the entire cathode layer 141 is facilitated.

The maximum cross-sectional height Rt, the arithmetic mean roughness Ra, and the arithmetic mean waviness Wa are measurement values determined in accordance with JIS B0601-'01.

The maximum cross-sectional height Rt is the maximum cross-sectional height of the roughness curve. Specifically, as shown in FIG. 6, the maximum cross-sectional height Rt is the sum of the maximum value of heights of peaks P of the roughness curve and the maximum value of depths of valleys V of the roughness curve within a reference length L.

The roughness curve is obtained as follows. A cross-sectional curve is obtained by measuring a surface using a surface roughness tester, and low-frequency components are removed from the cross-sectional curve through use of a high-pass filter (cut off value: λc), whereby the roughness curve is obtained.

The arithmetic mean roughness Ra is the mean value (µm) within the reference length L which is obtained by Expression (1) for a roughness curve y=f(x). Notably, the region of the recess 145 is contained in the reference length L used for this calculation (the region of the recess 145 is not excluded).

$$Ra=(1/L)\cdot\int_0^L |f(x)|dx \qquad (1)$$

The arithmetic mean waviness Wa is the mean value (µm) within the reference length L which is obtained by Expression (2) for a waviness curve y=g(x). Notably, the region of the recess 145 is contained in the reference length L used for this calculation (the region of the recess 145 is not excluded).

$$Wa=(1/L)\cdot\int_0^L |g(x)|dx \qquad (2)$$

The waviness curve is obtained as follows. A cross-sectional curve is obtained by measuring a surface using a surface roughness tester, and low-frequency and high-frequency components are removed from the cross-sectional curve through successive use of profile curve filters (cut off values: λf, λc), whereby the waviness curve is obtained.

Notably, Expressions (1) and (2) are identical with each other except the point that the roughness curve is used in Expression (1) and the waviness curve is used in Expression (2).

A method of manufacturing the fuel cell main body 140 will be described.

A green sheet containing the material (YSZ, etc.) of the solid electrolyte layer 143 is fired, whereby a sintered body (the solid electrolyte layer 143) is obtained.

The recesses 145 can be formed on the cathode layer 141 by one of the following three methods (1) to (3).

(1) Formation of the recesses 145 at the time of formation of a layer of the material of the cathode layer 141: The material (e.g., LSCF paste) of the cathode layer 141 is screen-printed on the solid electrolyte layer 143, and is fired.

In this case, the formation of the layer of the material of the cathode layer 141, the formation of the recesses 145, the roughening of the surface are performed simultaneously. The formation of the recesses 145 on the surface of the cathode layer 141 and the roughening of the surface are achieved by a screen mesh used for screen printing.

(2) Formation of the recesses 145 before firing of a layer of the material of the cathode layer 141: A layer of the material of the cathode layer 141 is formed on the surface of the solid electrolyte layer 143. The formation of the layer is performed by printing (screen printing, stamp printing, intaglio printing, offset printing) or bonding of a sheet containing the material of the cathode layer 141. After that, formation of the recesses 145 on the surface of the cathode layer 141 and the roughening of the surface are performed by means of embossing or the like. Further, the material of the cathode layer 141 is fired, whereby the cathode layer 141 is formed.

(3) Formation of the recesses 145 after firing of a layer of the material of the cathode layer 141: After the material of the cathode layer 141 is sintered, the surface of the cathode layer 141 is treated by embossing, sand blasting, or the like. Notably, when sand blasting is performed, a die having openings is used so as to sand-blast portions of the cathode layer 141 exposed from the openings, whereby the recesses 145 corresponding to the openings are formed.

In the above-described embodiment, the material (green sheet) of the solid electrolyte layer 143 is fired, whereby the solid electrolyte layer 143 (sintered body) is formed. After that, the layer of the material of the cathode layer 141 is formed. However, the solid electrolyte layer 143 and the cathode layer 141 may be laminated and fired simultaneously.

Notably, formation (formation and firing of the layer) of the anode layer 144 may be performed before, after, or simultaneously with formation (formation and firing of the layer) of the cathode layer 141.

(Second Embodiment)

In the first embodiment, the recesses 145 are provided on the cathode layer 141, whereby the cathode layer 141 is roughened. However, recesses may be provided on the anode layer 144, whereby the anode layer 144 is roughened. This will be referred to as a second embodiment.

In the second embodiment, recesses having a depth D1 are formed on the surface of the anode layer 144 of the fuel cell 100 at positions corresponding to those shown in FIGS. 4 and 5. Also, the current collector 181 is pressed against the anode layer 144. For the reason which will be described later, the distal end of the current collector 181 is not intruded into the anode layer 144 unlike the case of the first embodiment.

When the fuel cell 100 is manufactured, the anode layer 144 and the current collector 181 are superimposed on and pressed against each other, whereby the current collector 181 is pressed against the anode layer 144. As a results, despite the fact that the recesses are provided on the anode layer 144, reliable connection is established between the current collector 181 and the anode layer 144.

In the first embodiment, as a result of pressing, the distal ends of the current collectors 147 are intruded into the cathode layer 141. However, in the present embodiment, the strength of the anode layer 144 is greater than that of the cathode layer 141. Therefore, even when the current collector 181 is pressed, only the current collector 147 deforms (the distal end of the current collector 181 is not intruded into the anode layer 144).

As in the case of the recesses 145 of the cathode layer 141, the depth D1 of the recesses of the anode layer 144 is defined by the maximum cross-sectional height Rt of the roughness curve, and is for example, 3 μm.

As result of formation of the recesses on the surface of the anode layer 144, the surface area of the anode layer 144 increases, and the fuel gas is distributed to the entire surface of the anode layer 144.

It is preferred that the arithmetic mean roughness Ra of the surface of the anode layer 144 be 0.3 μm or greater. In this case, intake of the fuel gas into the anode layer 144 is facilitated.

It is preferred that the arithmetic mean waviness Wa of the surface of the anode layer 144 be 0.3 μm or less. In this case, distribution of gas to the entire anode layer 144 is facilitated.

A method of manufacturing the fuel cell main body 140 according to the second embodiment will be described.

A green sheet containing the material (YSZ, etc.) of the solid electrolyte layer 143 is fired, whereby a sintered body is obtained.

The recesses can be formed on the anode layer 144 by one of the following three methods (1) to (3).

(1) Formation of the recesses at the time of formation of a layer of the material of the anode layer 144: The material (e.g., NiO—ZrO$_2$ paste) of the anode layer 144 is screen-printed on the solid electrolyte layer 143, and is fired.

In this case, the formation of the layer of the material of the anode layer 144, the formation of the recesses 145, the roughening of the surface are performed simultaneously. The formation of the recesses on the surface of the anode layer 144 and the roughening of the surface are achieved by a screen mesh used for screen printing.

(2) Formation of the recesses before firing of a layer of the material of the anode layer 144: A layer of the material of the anode layer 144 is formed on the surface of the solid electrolyte layer 143. The formation of the layer is performed by printing (screen printing, stamp printing, intaglio printing, offset printing) or bonding of a sheet containing the material of the anode layer 144. After that, formation of the recesses on the surface of the anode layer 144 and the roughening of the surface are performed by means of embossing or the like. Further, the material of the anode layer 144 is fired, whereby the anode layer 144 is formed.

(3) Formation of the recesses after firing of a layer of the material of the anode layer 144: After the material of the anode layer 144 is sintered, the surface of the anode layer 144 is treated by embossing, sand blasting, or the like. Notably, when sand blasting is performed, a die having openings is used so as to sand-blast portions of the anode layer 144 exposed from the openings, whereby the recesses corresponding to the openings are formed.

In the above-described embodiment, the material (green sheet) of the solid electrolyte layer 143 is fired, whereby the solid electrolyte layer 143 (sintered body) is formed. After that, the layer of the material of the anode layer 144 is formed. However, the solid electrolyte layer 143 and the anode layer 144 may be laminated and fired simultaneously.

Notably, formation (formation and firing of the layer) of the cathode layer 141 may be performed before, after, or simultaneously with formation (formation and firing of the layer) of the anode layer 144.

(Third Embodiment)

Recesses are provided on the cathode layer 141 in the first embodiment, and are provided on the anode layer 144 in the second embodiment. However, recesses may be provided on both of the cathode layer 141 and the anode layer 144, whereby both of the cathode layer 141 and the anode layer 144 are roughened. This facilitates distribution of gas on both of the cathode layer 141 and the anode layer 144.

Recesses can be formed on both of the cathode layer 141 and the anode layer 144 by properly combining the methods (1) to (3) shown in the first embodiment and the methods (1) to (3) shown in the second embodiment. Formation (firing of the green sheet) of the cathode layer 141 and formation (firing of the green sheet) of the anode layer 144 may be performed simultaneously or may be performed such that formation of one layer is performed before formation of the other layer.

(Other Embodiments)

The embodiments of the present invention are not limited to the above-described embodiments, and can be expanded or modified. Such expanded or modified embodiments fall within the technical scope of the present invention.

DESCRIPTION OF SYMBOLS

10: solid oxide fuel cell
11: top surface
12: bottom surface
21-28: through-hole
41-48: bolt
51-58: nut
60: member
61: introduction pipe
62: member
62: member
100: fuel cell
101: air flow path
102: fuel gas path
110: inter connector
120: gas seal portion
121-124: through-hole
125: opening
127: cutout
130: separator
131-134: through-hole
135: opening
140: fuel cell main body
141: cathode layer
143: solid electrolyte layer
144: anode layer
145: recess
147: current collector
150: anode frame
151-154: through-hole
155: opening
160: gas seal portion
161-164: through-hole
165: opening
167: cutout
181: current collector

The invention claimed is:

1. A solid oxide fuel cell comprising:
a fuel cell main body which includes a cathode layer, a solid electrolyte layer, and an anode layer and which has a power generation function;
a connector having a bottom surface disposed to face an upper surface of the cathode layer;
a plurality of current collectors disposed between the cathode layer and the connector, individual ones of the plurality of current collectors having a first end which is in contact with the upper surface of the cathode layer and a second opposing end which is in contact with the bottom surface of the connector, to thereby electrically connect the cathode layer and the connector; and
a plurality of grooves formed in the upper surface of the cathode layer which increase a contact area between a gas and the upper surface of the cathode layer from which the gas diffuses into an interior of the cathode layer,
wherein the plurality of current collectors is arranged in a form of an array of plural rows and columns occupied by said plurality of current collectors so as to establish horizontally and vertically running gas flow paths along the upper surface of the cathode layer,
wherein the first end of each of the plurality of current collectors has a rectangular cross-section being in contact with the upper surface of the cathode layer and having a longer side and a shorter side,
wherein the vertically running gas flow paths are defined by the longer sides which extend along the vertically running gas flow paths, respectively,
wherein the horizontally running gas flow paths are defined by the shorter sides which extend along the horizontally running gas flow paths, respectively, and
wherein the plurality of grooves is arranged to intersect the horizontally and vertically running gas flow paths.

2. A solid oxide fuel cell according to claim 1, wherein the upper surface of the cathode layer which is in contact with the plurality of current collectors has an arithmetic mean roughness Ra greater than 0.3 μm.

3. A solid oxide fuel cell according to claim 1, wherein the upper surface of the cathode layer which is in contact with the plurality of current collectors has an arithmetic mean waviness Wa less than 0.3 μm.

4. A solid oxide fuel cell according to claim 1, wherein the plurality of grooves is formed along a direction in which an oxidizing gas supplied to the cathode layer flows.

5. A solid oxide fuel cell according to claim 1, wherein the plurality of current collectors is made of a material which is the same as the material of the connector such that the plurality of current collectors is united with the connector.

6. A solid oxide fuel cell according to claim 1, wherein the first ends of the plurality of current collectors are intruded into the cathode layer, and
a depth D2 of intrusion of the first end of at least one of the plurality of current collectors into the cathode layer is greater than a depth D1 of at least one of the plurality of grooves.

7. A solid oxide fuel cell comprising:
a fuel cell main body which includes a cathode layer, a solid electrolyte layer, and an anode layer and which has a power generation function;
a connector disposed to face a surface of one electrode layer among the cathode layer and the anode layer;
a plurality of current collectors disposed between the one electrode layer and the connector, individual ones of the plurality of current collectors having a first end which is in contact with the surface of the one electrode layer and a second opposing end which is in contact with a surface of the connector, the surfaces facing each other, to thereby electrically connect the one electrode layer and the connector; and
a plurality of grooves formed in the surface of the one electrode layer which increase a contact area between a gas and the surface of the one electrode layer from which the gas diffuses into an interior of the one electrode layer,
wherein the plurality of grooves extends in two directions which are inclined in relation to a direction of a flow path of an oxidizing gas supplied to the cathode layer or a direction of a flow path of a fuel gas supplied to the anode layer, wherein the plurality of current collectors is arranged in a form of an array of plural rows and columns occupied by said plurality of current collectors so as to establish horizontally and vertically running gas flow paths along the surface of the one electrode layer, wherein the first end of each of the plurality of current collectors has a rectangular cross-section being in contact with the surface of the one electrode layer and having a longer side and a shorter side, wherein the vertically running gas flow paths are defined by the longer sides which extend along the vertically running gas flow paths, respectively, wherein the horizontally running gas flow paths are defined by the shorter sides which extend along the horizontally running gas flow paths, respectively, and wherein the plurality of grooves is arranged to intersect the horizontally and vertically running gas flow paths.

8. A solid oxide fuel cell according to claim 7, wherein the surface of the one electrode layer which is in contact with the plurality of current collectors has an arithmetic mean roughness Ra greater than 0.3 μm.

9. A solid oxide fuel cell according to claim 7, wherein the surface of the one electrode layer which is in contact with the plurality of current collectors has an arithmetic mean waviness Wa less than 0.3 μm.

10. A solid oxide fuel cell according to claim 7, wherein the plurality of current collectors is made of a material which is the same as the material of the connector such that the plurality of current collectors is united with the connector.

11. A solid oxide fuel cell according to claim 7, wherein the two extending directions of the plurality of grooves have inclination angles of ±45° in relation to the direction of the flow path of the oxidizing gas or the fuel gas.

12. The solid oxide fuel cell according to claim 1, wherein the plurality of grooves is formed in a pattern on a top area of the upper surface of the cathode layer.

\* \* \* \* \*